United States Patent [19]
Keller

[11] Patent Number: 6,134,129
[45] Date of Patent: Oct. 17, 2000

[54] CURRENT SHARING SIGNAL COUPLING/ DECOUPLING CIRCUIT FOR POWER CONVERTER SYSTEMS

[75] Inventor: Steven J. Keller, Fremont, Calif.

[73] Assignee: RO Associates, Sunnyvale, Calif.

[21] Appl. No.: 09/285,810

[22] Filed: Apr. 1, 1999

Related U.S. Application Data

[60] Provisional application No. 60/100,905, Sep. 23, 1998.

[51] Int. Cl.[7] .................................................. H02M 3/135
[52] U.S. Cl. ................................. 363/65; 307/58; 307/82
[58] Field of Search ................................ 363/65, 67, 69, 363/71; 323/272; 307/58, 82

[56] References Cited

U.S. PATENT DOCUMENTS

| | | | |
|---|---|---|---|
| 5,267,136 | 11/1993 | Suga et al. .................................. | 363/65 |
| 5,404,092 | 4/1995 | Gegner ..................................... | 323/207 |
| 5,418,708 | 5/1995 | Nairus ....................................... | 363/65 |
| 5,521,809 | 5/1996 | Ashley et al. ............................. | 363/71 |
| 5,563,780 | 10/1996 | Goad ........................................ | 363/71 |
| 5,672,958 | 9/1997 | Brown et al. ............................ | 323/269 |
| 5,682,303 | 10/1997 | Goad ........................................ | 363/71 |
| 5,740,023 | 4/1998 | Brooke et al. ............................ | 363/65 |
| 5,768,117 | 6/1998 | Takahashi ................................. | 363/65 |
| 5,923,549 | 7/1999 | Kobayashi et al. ....................... | 363/65 |
| 5,946,206 | 8/1999 | Shimizu et al. .......................... | 363/65 |

*Primary Examiner*—Adolf Deneke Berhane
*Attorney, Agent, or Firm*—Claude A. S. Hamrick; Oppenheimer Wolff & Donnelly

[57] ABSTRACT

An improved current sharing signal coupling/decoupling circuit for use in each module of a system including a plurality of parallel connected modules, each such circuit providing an interface between a module's "current sharing signal" port and a common connection bus. The signal coupling/decoupling circuits also share a common ground noted in the disclosure as a "current sharing reference". Each circuit is comprised of a variable reference based decoupling subcircuit, including a first comparator, a bi-directional switch, and a variable voltage reference, and a fixed referenced based decoupling circuit including a second comparator, a scalar resistor and a fixed voltage reference. The variable reference comparator senses the difference between the variable reference voltage and the voltage on the associated module's current sharing signal port, and activates the bi-directional switch to disconnect the module. In the fixed reference subcircuit, the second comparator activates the bi-directional switch to disconnect the module from the common current sharing signal bus, if the sensed signal as scaled by the scalar network resistor, drops below the fixed reference voltage. The scalar resistor is included in the second subcircuit to allow the use of a standard voltage reference to implement the fixed reference.

19 Claims, 7 Drawing Sheets

CURRENT SHARING SIGNAL COUPLING/DECOUPLING CIRCUIT FOR POWER CONVERTER SYSTEMS

CROSS REFERENCE TO RELATED APPLICATION

This application claims the benefit of U.S. Provisional Application Ser. No. 60/100,905, filed Sep. 23, 1998, entitled "Improved Current Sharing Signal Coupling/Decoupling Circuit For Power Converter Systems".

BACKGROUND OF THE INVENTION

1. Field of the Invention

The present invention relates generally to power converters and more particularly, to improved control circuitry for allowing the interconnection and control of a plurality of modular power supplies used to drive a common load.

2. Brief Description of the Prior Art

Current mode controlled power supplies, sometimes referred to as power converters, are commonly used to provide power for numerous types of electronic apparatus. One such apparatus and other prior art, are disclosed and discussed in the U.S. Pat. No. 5,428,523, issued to John E. McDonnal on Jan. 27, 1995.

The McDonnal apparatus uses a variable reference and a comparator to detect sudden changes in the current sharing signal of a module in an n+N redundant system of DC—DC converter modules. These changes, once detected, will trigger a bi-directional switch to open, thereby disconnecting the faulty module from the common current sharing bus and preventing the remaining modules in the system from being adversely affected. In general, the variable reference is designed such that its output tracks the current sharing bus with a slight built-in offset. The offset allows for some variation and noise within the current sharing signal of the module without causing false fault detection. While the variable reference tracks slow variations in the common current sharing bus, its output is designed to be slew rate limited so that it can not track fast changes. Accordingly, if a fast change occurs, a fault will be detected and the module will be disconnected as desired.

Since the McDonnal invention detects faults solely by comparing the current sharing signal to a variable reference, it can not detect faults that cause variations in the current sharing signal bus that the variable reference can successfully track. For example, the prior art system will not detect the class of faults that cause slow moving or steady state changes in the current sharing signal that results in a slow moving or steady state error in the output voltage of the system.

To address this issue, one might suspect that the speed of the variable reference be made arbitrarily slow to detect any class of faults desired. However, because of reasons to be explained below, it is undesirable to have the reference speed set so slow that normal input and load transients cause the system to de-couple.

The startup assist circuit of the above-referenced prior art provides varying amounts of "assistance" to the starting module as its output voltage changes. The assistance is provided by lowering the voltage at the starting modules sense terminals to a level that is below its set point voltage. The amount of assistance provided is a function of the module's set point voltage, the module's current output voltage, and the system's sense bus voltage. With some modules whose output set-point is below the sense bus voltage, the startup assistance provided will diminish to zero before the output has reached the bus voltage. In these cases coupling of the starting module's current sharing signal to the current share bus will only occur if two conditions are met:

1. The current needed during startup (to charge internal and external capacitors) requires a current sharing signal that is higher than the variable reference derived from the common current sharing bus; and
2. The coupling circuit responds quickly enough to couple the current share signal of the starting module to the common current share buss before it drops back down to its idle state.

If these two conditions are met, the unit will be coupled into the system. If they are not met, the starting module will idle with its output at some intermediate voltage below the common output bus voltage.

There are also some non-fault conditions or events that can cause a particular module's current sharing signal to become disconnected from the common current sharing bus. Some examples are high speed load transients, high speed transients on the common current sharing bus, and noise. When these conditions or events occur, some or all of the modules may be de-coupled from the common current sharing bus. Because of the variable assistance of the prior art startup assist circuit, a de-coupled module is not guaranteed to re-couple with the common current sharing bus unless either its output voltage set-point is higher than the sensed output voltage, or condition 2 above applies. If a module is not re-coupled it will idle with its output at some intermediate voltage below the common output bus voltage.

In addition, the startup assist circuits of the prior art can be subjected to relatively high levels of power dissipation during fault conditions in which the output of a module is shorted. These conditions require that the startup assist resistors either be oversized to handle the power dissipation during the fault or that protection circuits be added to limit the power dissipation in the resistors.

3. Objectives of the Present Invention

It is therefore an objective of this invention to improve the fault detection capability of the prior art decoupling circuits to detect faults that result in slow moving or steady state errors in the current sharing signal of the faulty module.

Another objective of this invention to improve the startup assist circuitry to provide constant amounts of "assistance" for all de-coupled modules for as long as they are de-coupled.

Still another objective of this invention to improve the startup assist circuitry by reducing the dissipated power during fault conditions thereby reducing the cost and size of the startup assist circuitry.

SUMMARY OF THE INVENTION

Briefly, a preferred embodiment of the present invention includes the provision of an improved individual current sharing signal coupling/decoupling circuit for each module of a number of parallel connected modules, each such circuit providing an interface between a module's "current sharing signal" port and a common connection bus. The signal coupling/decoupling circuits also share a common ground noted in the disclosure as a "current sharing reference". Each circuit is comprised of a variable reference based decoupling subcircuit, including a first comparator, a bi-directional switch, and a variable voltage reference, and a fixed referenced based decoupling circuit including a second comparator, a scalar resistor and a fixed voltage reference. The variable reference comparator senses the difference between the variable reference voltage and the voltage on the associated module's current sharing signal port, and activates the bi-directional switch to disconnect the module. In the fixed reference subcircuit, the second comparator activates the bi-directional switch to disconnect the module from the common current sharing signal bus, if the sensed signal as scaled by the scalar network resistor, drops below the fixed reference voltage. The scalar resistor is included in the second subcircuit to allow the use of a standard voltage reference to implement the fixed reference.

An important advantage of the present invention is that it provides a decoupling circuit that is capable of detecting not only sudden changes in current sharing signals, but also detects faults that result in slow moving or steady state errors in the current sharing signal of a faulty module.

These and other objects and advantages will no doubt become apparent to those skilled in the art after having read the following detailed description of the preferred embodiments of the present invention.

DETAILED DESCRIPTION OF THE PREFERRED EMBODIMENTS

Figure 1:
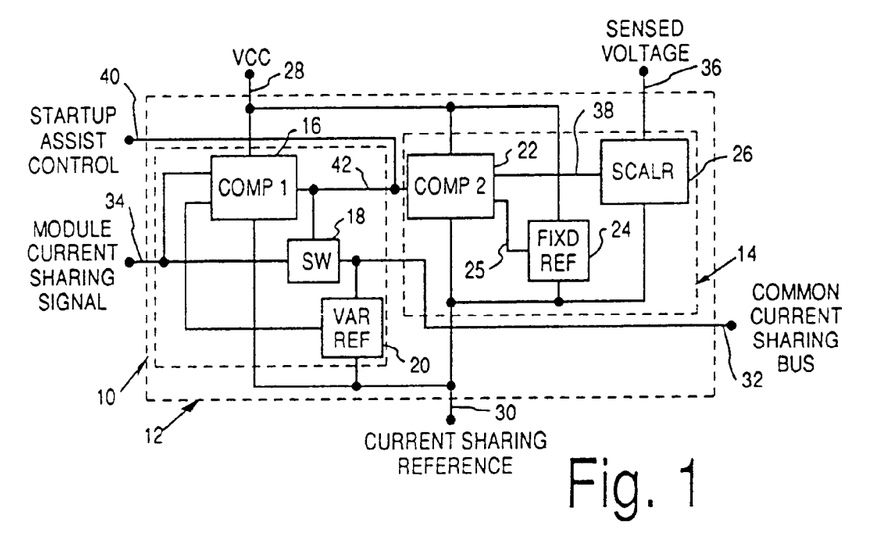
FIG. 1 is a block diagram illustrating the various components of an improved decoupling circuit in a accordance with the present invention.

Referring now to FIG. 1 of the drawing, a coupling/decoupling circuit (hereinafter referred to as a "decoupling circuit") is shown at 10 and includes a variable reference-based decoupling subcircuit 12 and a fixed reference-based decoupling subcircuit 14. Subcircuit 12 is comprised of a variable reference comparator 16, a bi-directional switch 18, and a variable reference element 20. The subcircuit 14 is comprised of a second comparator 22, a fixed reference element 24 and a scalar resistor or element 26. Subcircuit 12 is connected between a supply voltage $V_{cc}$ at terminal 28, and a current sharing reference voltage or circuit ground at terminal 30. Subcircuit 12 senses the difference between the voltage on the common connection bus 32, the "common current sharing signal", less an amount set by the variable voltage reference element 20, and the voltage on the modular current sharing signal port 34, the "module current sharing signal." If the module current sharing signal drops below the output of the variable reference element 20, the comparator activates the bi-directional switch 18, disconnecting the module current sharing signal port 34 from the common connection bus 32, thereby allowing any remaining parallel connected modules to continue normal operation.

In the fixed reference-based decoupling subcircuit 14, the comparator 22 activates the bi-directional switch 18 in subcircuit 12 to disconnect the module from the common current sharing signal bus 32 if the sense signal voltage appearing at a terminal 36 as scaled by the scalar element 26 drops below the fixed reference voltage determined by the element 24. This does not exclude the possibility of the scalar constant being equal to 1, which results in a direct connection of the comparator input 38 directly to the sensed voltage at terminal 36. A startup assist control terminal 40 is connected to the control port, i.e., node 42, of the bi-directional switch 18 in subcircuit 12, and will be discussed below.

Figure 2:
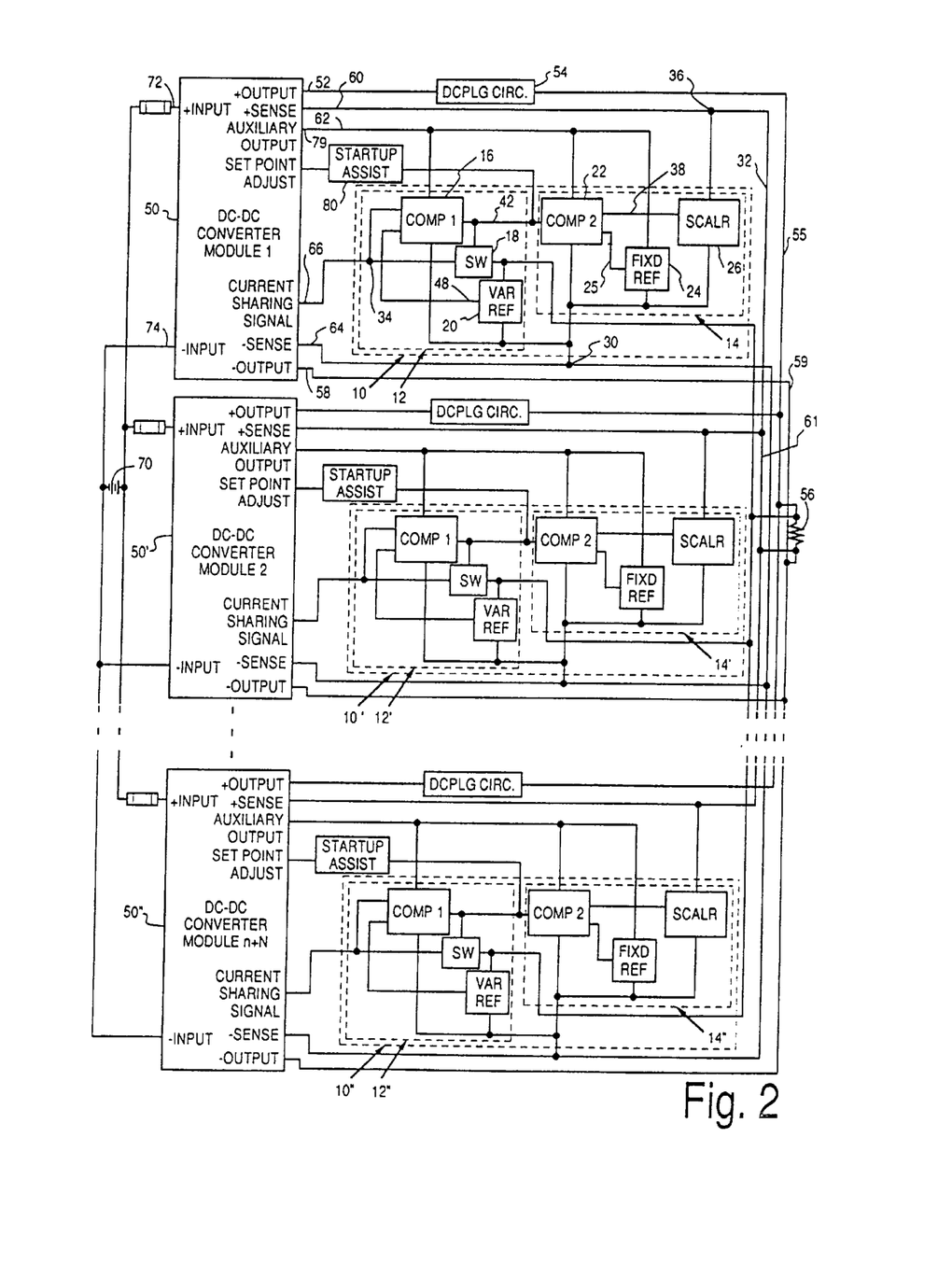
FIG. 2 is a block diagram illustrating use of the decoupling circuit of FIG. 1 in an n+N system of DC—DC converter modules.

FIG. 2 depicts a plurality of the decoupling circuits 10 connected in a system of n+N modules 50, 50' and 50". In the illustrated circuit, shown in more detail in the schematic circuit of FIG. 3, each module includes a + output terminal 52 which is connected through a DCPLG circuit 54 to one side of a load 56, the other side of load 56 being connected to a − output terminal 58. A + sense terminal 60 is connected in common with the sense terminals of all of the modules 50 and to each sensed voltage terminal 36. In this embodiment, power is supplied to the comparators 16 and 22 by means of an auxiliary output terminal 62, and the common sharing reference, or system ground terminal, 30 is connected to a − sense terminal 64. The module current sharing signal terminal 34 of each decoupling circuit is coupled to a current sharing signal port 66 of the corresponding converter module 50. The positive terminal of a DC power supply 70 is connected to a positive input terminal 72 of each converter module, while the negative terminal of the supply is connected to the negative input terminal 74 of each convector module.

Current Share Error Causes Output Voltage Error

Operation of the improved de-coupling circuit of the present invention is predicated on the fact that errors in the current sharing signal of an individual module 50 can only result in a low output voltage. If the fault or error causes a module to drive its current sharing signal port 66 high, it will be unable to affect the common current sharing bus 32, and will itself be controlled by the module in control of the common current sharing bus 32. This is a direct result of the ability of a module's current sharing port 66 to sink more current than it can source. If the fault or error causes a module to drive its current sharing signal port 66 low, it will take control of the common current sharing bus 32, again, because of the ability of the current sharing port 66 to sink more current than it can source. If the common current sharing bus 32 is driven low, the output voltage bus 55 of the system will drop because there will be insufficient current supplied from the paralleled system of modules 50, 50' . . . 50".

Fixed Reference Comparator Operation

The positive input of comparator 22 is connected to the output port of the scalar 26, the negative input of the comparator is connected to the fixed reference output 25, and the output of the comparator (node 42) is connected to the control port of the bi-directional switch 18. The comparator positive supply is connected to the auxiliary voltage supply terminal 62, and the comparator ground terminal 30 is connected to the ground reference for the sensed voltage signal. The comparator 22 compares the output voltage at the output 38 from the scalar 26 to the output voltage at 25 of the fixed reference 24. If the scalar output voltage at the output 38 is larger than the fixed reference voltage at 25, then the output of the comparator 22 is allowed to go high to a level that will cause the bi-directional switch 18 to close. This electrically connects the current sharing port 66 of the module to the common current sharing bus 32. If the scalar output voltage at the output 38 is smaller than the fixed reference voltage at 25, then the output of the comparator 22 is driven low to a level that will cause the bi-directional switch 3 to open, thereby disconnecting the module's current sharing signal port 14 from the common current sharing bus. The comparator output at node 42 must either be compatible with a "wired AND" connection of its output, as in this preferred embodiment, or additional circuitry must be added.

The additional circuitry must allow both the fixed reference comparator 22 and the variable reference comparator 16 to drive the control port of the bi-directional switch 18 in an "ANDed" fashion. It should be noted that the aforementioned constraints on the output port of the fixed reference comparator 22 also apply to the output of the variable reference comparator 16. There are no timing constraints on the performance of the fixed reference comparator 22 except that faster comparators will minimize the impact of a fault on the system. A resistor (23 in FIG. 3) adds some hysteresis to the operation of the comparator 22 to eliminate any chatter effects that may be caused by noise or ripple on the sensed voltage at node 36. The amount of hysteresis is determined by the value of the resistor 23 and the output resistance of the scalar 26.

Figure 4:
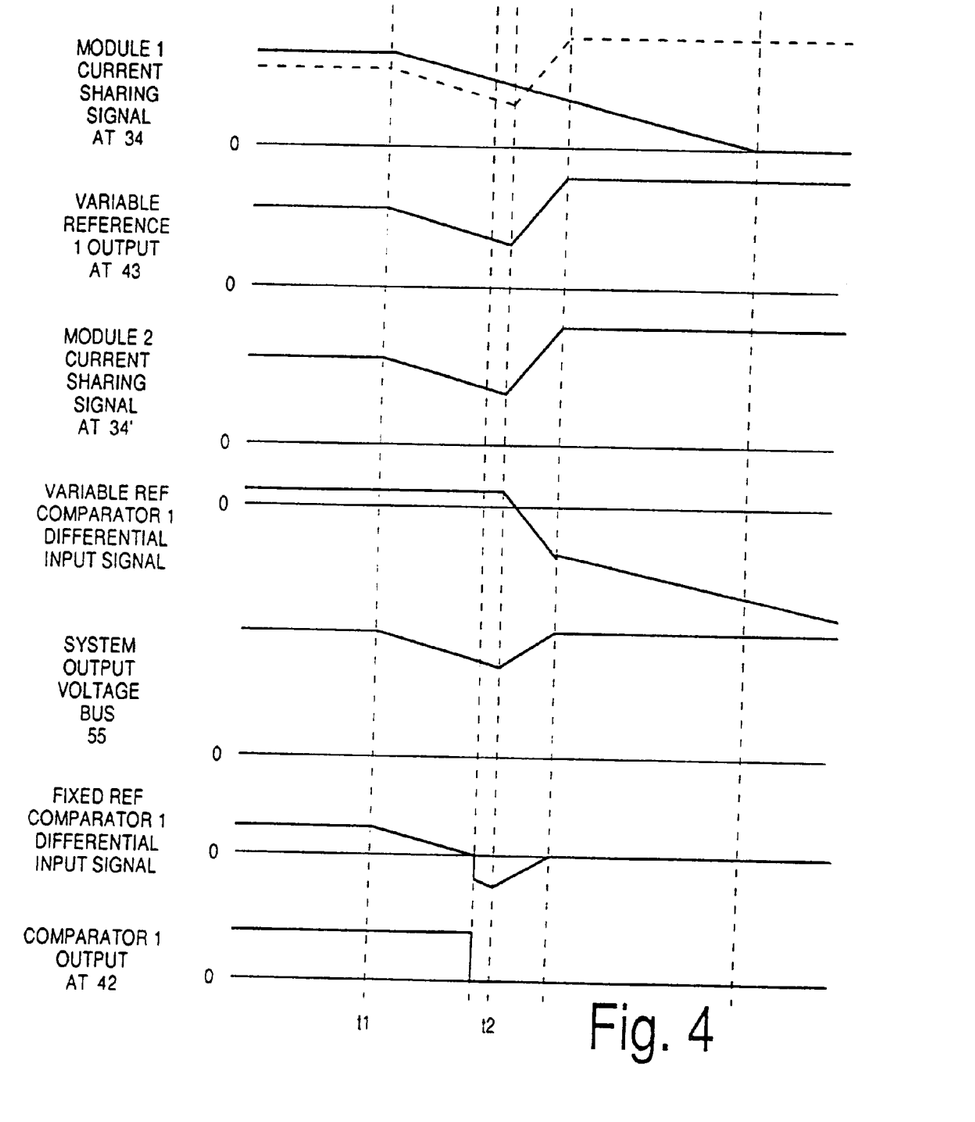
FIG. 4 shows a timing diagram illustrating a "slow" moving fault of the type detected by the present invention.

FIG. 4 is a timing diagram showing the operation of the improved decoupling circuit during an event when the current sharing signal of Module 1 (50) slowly drops to zero and its decoupling circuit functions. Shown in this figure are the current sharing signals at 34 and 34' for Module 1 (50) and Module 2 (50') respectively, the Module 1 variable reference output at 43, the differential input signals for both the Module 1 variable reference comparator 16 and the Module 1 fixed reference comparator 22, the Module 1 comparator output at 42 (which is common to both Module 1 comparators), and the system output voltage on bus 55. Initially both modules are operating normally, equally sharing the current to the load. The current sharing signal of each module is coupled to the common current sharing bus and the two are therefore equal. The Module 1 variable reference output voltage is just below the level of the common current sharing bus so that the output of the variable reference comparator 16 is in its high, or open, state. The system output voltage bus is within tolerance so that the fixed reference comparator 22 is also in its high, or open, state and therefore the bi-directional switch control port 42 is high, being pulled high by the resistor 24 in the variable reference subsystem 12.

At time t1, an event occurs, most likely a failure, that causes the current sharing signal of Module 1 to slowly go to zero Volts. Because they are coupled together, the current sharing signal of Module 2 is pulled down by the Module 1 current sharing signal at 34. With both current sharing signals being low, the output will drop as well because there is insufficient current being supplied by the modules. Since the Module 1 current sharing signal is moving slowly, its variable reference output will track it and the differential input signal to the variable reference comparator remains positive. It will be noted that the variable reference subsystem 12 has failed to detect the fault. As the output voltage continues to decrease, the differential input signal to the fixed reference comparator 22 also decreases until it becomes zero. At this point the fixed reference comparator drives its output low and the hysteresis resistor 23 drives the differential input signal to the fixed reference comparator 22 further negative. After a short delay due to the response time of the comparator 22, the bi-directional switch 18 is activated and opens up, isolating the Module 1 current sharing signal from the common current sharing bus. Once decoupled, Module 2 quickly raises its current sharing signal to a level sufficient to provide the necessary current to the load 56.

Fixed Reference Operation

Figure 3:
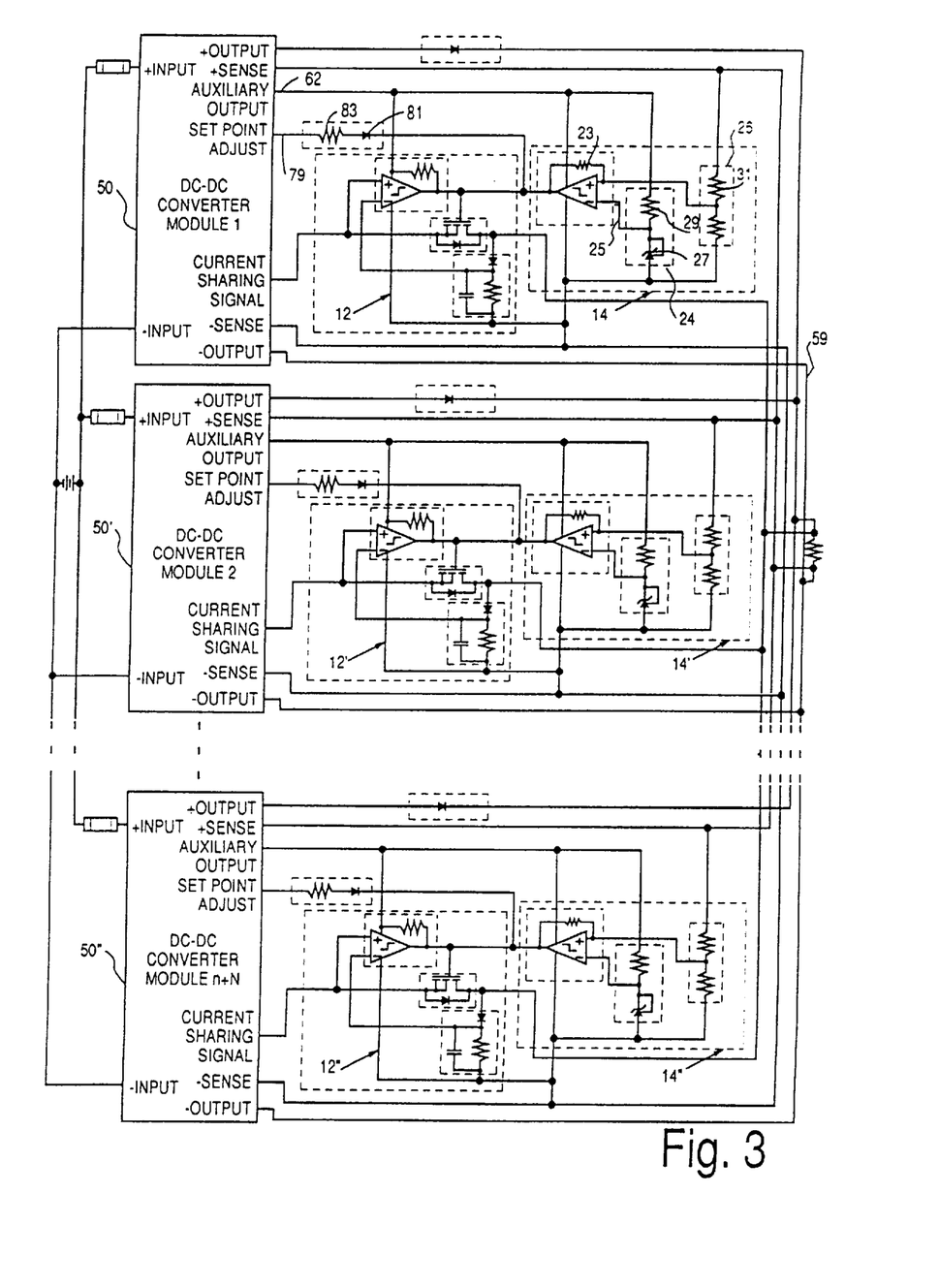
FIG. 3 is a schematic diagram showing electrical components used to implement the embodiment of FIG. 2.

The fixed reference 24 provides a threshold voltage for the operation of the fixed reference comparator 22. Either a two port shunt reference or a three port active reference can be used to implement the fixed reference. In the preferred embodiment, a two port shunt reference 27, such as a type TLV431, and a biasing resistor 29 are used. The biasing resistor 29 is connected from the positive port of the shunt reference 27 to the auxiliary voltage supply 62.

The reference ground is connected to the ground of the comparator 22 and the ground of the scalar 26.

Scalar Operation

The scalar block 26 is implemented using a fixed resistor divider 31, whose output-to-input voltage ratio is determined by the desired trip threshold for the sensed voltage at node 36, and the output voltage at 25 of the voltage reference chosen to implement the fixed reference 6. The output-to-input voltage ratio of the scalar is affected by the hysteresis resistor 23 and must be accounted for when the resistor values for the divider are selected. In situations where a unity scaling factor is required, a single fixed resistor from the sensed voltage at node 36 to the positive input of the fixed reference comparator 22 should be used.

Powering The Decoupling Circuit

Figure 5:
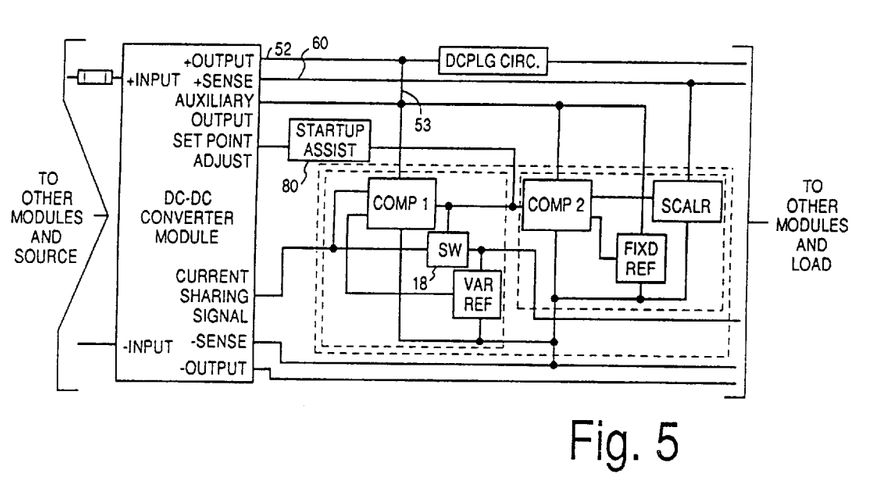
FIG. 5 illustrates an application of the decoupling circuit of the present invention powered from the module output terminal where an auxiliary supply voltage is not available.

Auxiliary voltage supply at output 62 provides power to the decoupling circuit 10, specifically the fixed reference comparator 22, the variable reference comparator 16, and the fixed reference 24. In the preferred embodiment, the auxiliary voltage supply on line 62 is provided by the DC—DC converter module associated with the decoupling circuit. In situations where an auxiliary supply voltage is not available, the output voltage of the module at terminal 52 can be used, as shown at 53 in FIG. 5, if its voltage is sufficiently high. Alternatively, another supply voltage, such as a house-keeping supply or another existing system output voltage can be used in multiple output systems.

Startup Assist Description of Operation

The startup assist component 80 monitors the control port of the bi-directional switch 18. If the switch 18 is commanded to its open state, the startup assist component is activated and the set-point of the associated module is adjusted up by a fixed amount, regardless of its output voltage. The amount of assist is chosen such that good modules will have their set-point voltage trimmed above the common output sense bus 61 and bad modules, whose set-points are too low, will still have their set-point voltage below that on the common output sense bus 61. A module will not start if its set-point is below the voltage of common output sense bus 61. A good module will start and try to raise the common output voltage bus 55 to its set point by taking more than its fair share of the load current, thus driving its current share signal at terminal 66 above the output of the variable reference 20 The variable reference comparator 16 will allow its output to go high, activating the bi-directional switch 18. The bi-directional switch 18 will couple the starting module's current sharing signal at 66 to the common current sharing bus 32 and its output current will then be controlled by the system. Once the starting module is coupled, the startup assist is deactivated and the module's set point is returned to its nominal level.

In the embodiment of the current invention shown in FIG. 3, the DC—DC converter has the characteristic that current flowing out of the trim port causes an increase in output voltage proportional to the magnitude of the current. When the control port of the bi-directional switch 18 is driven low, to de-couple the module's current sharing signal at 66 from the common current sharing bus 32, the diode 81 and resistor 83 will conduct current from the trim port 79 of the module to the output port(s) of whichever comparator is driving the bi-directional switch 18 off. The magnitude of the current is set by the resistor 83. When the control port of the bi-directional switch 18 is driven high, to couple the module's current sharing signal at 66 to the common current sharing bus 32, the diode 81 will block current flow, thereby shutting off the startup assist and returning the module's set point to its nominal value.

VARIATIONS ON THE PREFERRED EMBODIMENT

Primary Side decoupling vs. Secondary Side decoupling

Figure 6:
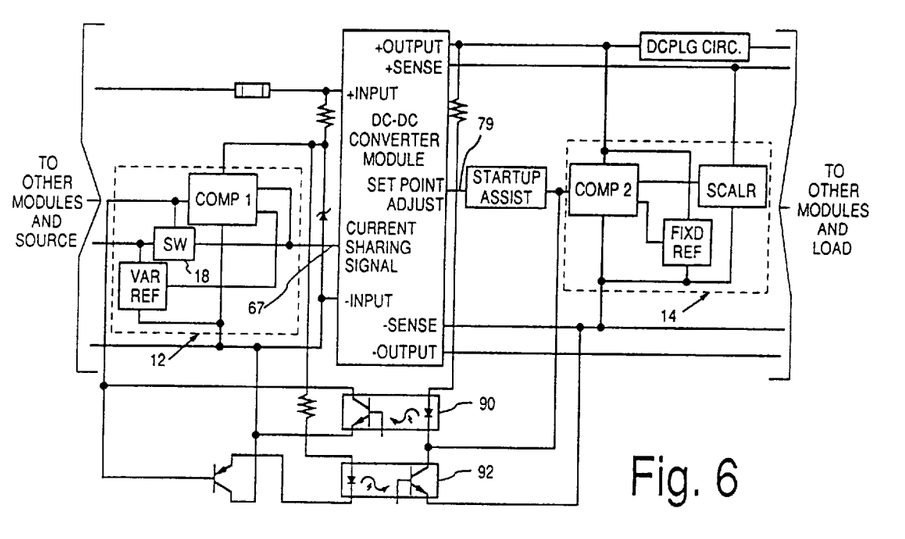
FIG. 6 depicts application of the decoupling circuit to modules having their current sharing signal port on their primary side and their set point adjust port on the secondary side.
Figure 7:
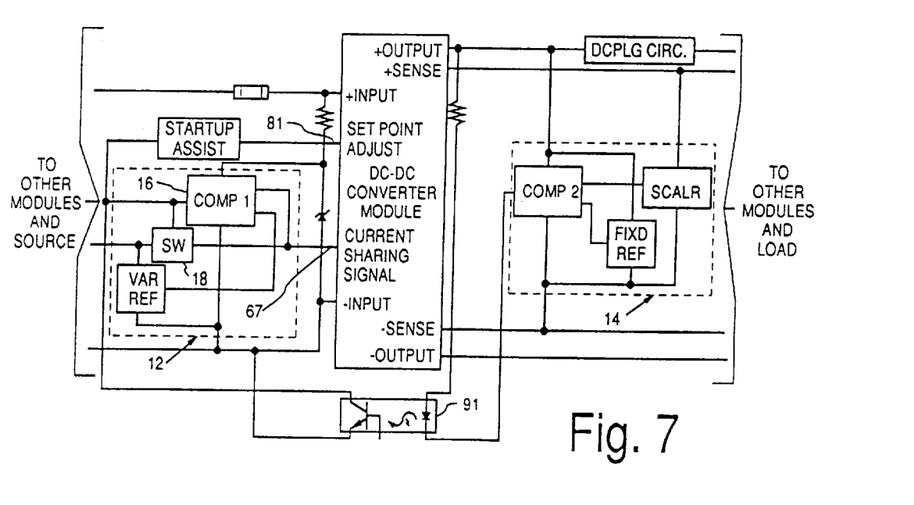
FIG. 7 is a block diagram illustrating application of the decoupling circuit to modules having their current sharing signal port and set point adjust port on their primary side.

The illustrated embodiment of the invention described above uses DC—DC converters that have their current sharing signal port, and their set point voltage trimming port on the secondary, or output, side of the modules. However, not all DC—DC converter modules will meet this requirement. FIGS. 6 and 7 show an application of the present invention to two of the more common variations in module configuration.

FIG. 6 shows the application of the present invention to a system of modules having a current sharing port 67 on their primary or input side, and their set point trimming port 79 on the secondary or output side. This approach is not preferred because it results in a much more complex system. In this embodiment the control input to the bi-directional switch 18 is split between the primary and secondary of the modules. Because there is an input function and an output function for the bi-directional switch control signal on each side of the module a bi-directional isolation device is required. On the primary side the control signal is an input to the bi-directional switch and an output from the variable reference comparator. On the secondary side the control signal is an input to the startup assist circuit and an output from the fixed reference comparator. In this embodiment a pair of 4n25a opto-isolators 90, 92 is used to accommodate each direction of signal flow on the control signal. One of the isolation devices can be eliminated if the startup assist circuitry of the previously described McDonnal apparatus is used.

FIG. 7 shows the application of the present invention to a system of modules having both a current sharing port 67 and a set point trimming port 81 on their primary or input side. This approach is not preferred because it results in a much more complex system. In this embodiment the control input to the bi-directional switch is split between the primary and secondary of the modules. Because there is only an output function for the bi-directional switch control signal on the secondary side of the module a unidirectional isolation device 91 is required. On the primary side the control signal is an input to the bi-directional switch and the startup assist circuits, and an output from the variable reference comparator 16. On the secondary side the control signal is an output from the fixed reference comparator 22. In this embodiment a single 4n25a opto-isolator 91 is used for signal flow on the control signal.

Alternate Sensed Voltage Embodiments

Figure 8:
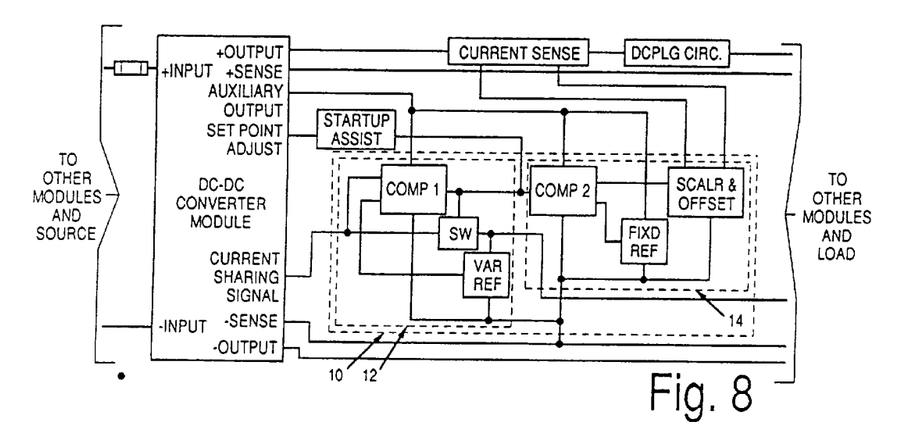
FIG. 8 illustrates use of the module output current as the sensed voltage input to the scalar resistor.
Figure 9:
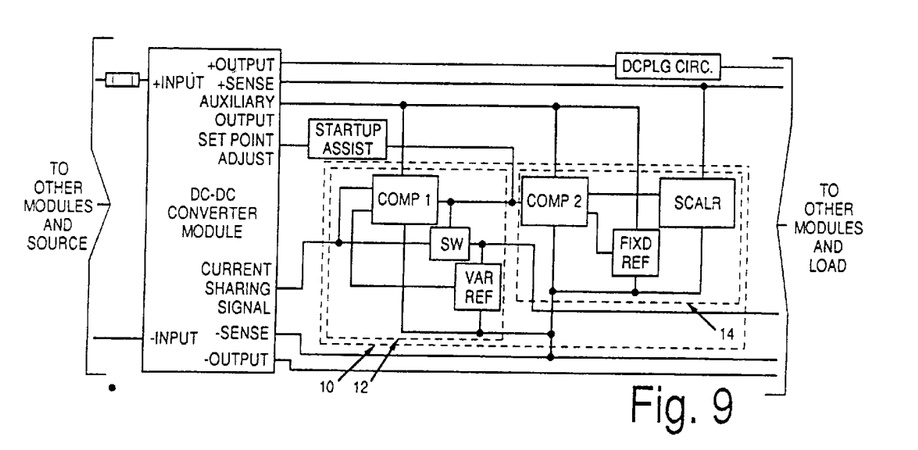
FIG. 9 illustrates use of the module output voltage as the sensed voltage input to the scalar resistor.

In the preferred embodiment the sensed signal is that appearing on the common output sense bus 59. However any signal, directly measured or derived, that drops during a fault condition can be used to trigger a disconnect. Two examples of such signals are the output voltage and output current of the module connected to the disconnect circuit. Top level connection diagrams for these embodiments are shown in FIG. 8 and 9.

The output voltage of the module is not preferred for the sensed voltage because it is loosely regulated, whereas the sensed output voltage is tightly regulated. The loose regulation is caused by the output decoupling circuit, which is usually implemented using an OR'ing diode, and any resistive cabling losses. The output voltage of the module will be equal to the tightly regulated sensed output voltage plus the forward voltage drop of the OR'ing diode plus the voltage drop due to cabling losses. The voltage drop of the diode and cables will vary with load current and temperature. To prevent false fault detection, the threshold voltage of the fixed reference fault detection circuits must be set assuming the smallest expected voltage drop. If the threshold voltage were not set as such, a low voltage drop will cause the output voltage of the module to fall below the threshold voltage causing a false fault detection. When the threshold voltage is set assuming the smallest expected voltage drop and the actual voltage drop is larger, then the load must be able to withstand a dip in the system output voltage bus equal to the difference in the two voltage drops. For example, if the smallest expected voltage drop is 0.05 volts, corresponding to a minimum load condition, and the actual voltage drop is 0.45 volts; then the system must be able to withstand a 0.4 volt dip in the common output voltage bus before the fault is detected. For a low voltage system such as 5V or lower such a dip would generally not be acceptable.

The output current of the module is not preferred for the sensed voltage because it is generally expensive to sense current, both in monetary terms and in terms of system efficiency. In addition, the output current is usually a widely varying parameter and will generally result in thresholds that are to far removed from the actual current to provide acceptable deviations in the output voltage bus.

Although the present invention has been described above in terms of several particular embodiments, it is anticipated that other variations will become apparent to those skilled in the art after having read this disclosure. It is therefore intended that the following claims be interpreted as covering all such variations and embodiments, as fall within the true spirit and scope of the invention.

What I claim is:

1. An improved circuit for coupling/decoupling the current sharing signal terminal of a power converter module to an interconnecting bus in a power supply system including a plurality of current mode controlled power converter modules normally having their current sharing signal terminals connected to the interconnecting bus, the output terminals of said modules being connected in parallel to energize a common load with a system output voltage, the circuit comprising:

variable reference means for developing a variable reference voltage;

first comparator means for comparing the voltage developed at the current sharing signal terminal of a corresponding power converter module to said variable reference voltage and operative to generate a first control signal having a first signal state when a first predetermined difference indicative of normal operation of the module is detected between the compared voltages, and having a second signal state when a second predetermined difference indicative of a malfunctioning module is detected between the compared voltages;

fixed reference means for developing a fixed reference voltage;

second comparator means for comparing a signal derived from the system output voltage to said fixed reference voltage and operative to generate a second control signal having a first signal state when a third predetermined difference indicative of normal operation of the system is detected between the voltage compared by said second comparator means, and having a second signal state when a fourth predetermined difference indicative of a malfunctioning system is detected between the compared voltages; and switching means responsive to said first and second control signals and operative to connect said current sharing signal terminal to said interconnecting bus when both said first and second control signals are of said first signal state, and to disconnect said current sharing signal terminal from said interconnecting bus when either of said first and second control signals are of said second signal state, whereby in the event said corresponding power converter module malfunctions, it will be effectively disconnected from the system.

2. An improved circuit as recited in claim 1 wherein said fixed reference means is coupled to a particular output of said power converter module and is operative to cause said fixed reference voltage to have a predetermined relationship to the voltage appearing on said particular output.

3. A circuit as recited in claim 2 wherein a scaling resistor is used to develop a scaled voltage proportioned to a voltage developed by said module, and wherein said second comparator means compares the scaled voltage to said fixed reference voltage and generates said second control signal of said first signal state when the voltage differential input thereto exceeds a predetermined threshold, and generates said second control signal of said second signal state when the voltage differential input thereto is less than said predetermined threshold.

4. An improved circuit as recited in claim 1 wherein said switching means is a bi-directional electronic device allowing current to flow in either direction therethrough.

5. An improved circuit as recited in claim 1 wherein the power converter module has a current sharing port on its input side and a set point adjust port on its output side, wherein said variable reference means, said first comparator means and said switching means are associated with the input side of the power converter module, and said second comparator means is associated with the output side of the power converter module, and wherein the control input to the switching means is split between the input and output sides of the circuit.

6. An improved circuit as recited in claim 5 wherein signal isolation means is provided to electrically isolate control signals developed on the output side from the input side.

7. An improved circuit as recited in claim 6 wherein said signal isolation means is bi-directional and also serves to electrically isolate control signals developed on the input side from the output side.

8. An improved circuit as recited in claim 6 wherein said signal isolation means includes opto-isolator apparatus.

9. An improved circuit as recited in claim 7 wherein said signal isolation means includes opto-isolator apparatus.

10. An improved power supply system comprising:

a plurality of current mode controlled power converter modules each having a current sharing signal terminal and power output terminals, the corresponding power output terminals of the several modules being connected together and adapted to power a common load;

an interconnecting signal bus; and a plurality of current sharing signal coupling/decoupling circuits, each of which is associated with one of said modules, each said circuit including;

variable reference means for developing a variable reference voltage, first comparator means for comparing the voltage developed at the current sharing signal terminal of a corresponding power converter module to said variable reference voltage and operative to generate a first control signal having a first signal state when a first predetermined difference indicative of normal operation of the module is detected between the compared voltages, and having a second signal state when a second predetermined difference indicative of a malfunctioning module is detected between the compared voltages, fixed reference means for developing a fixed reference voltage, second comparator means for comparing a signal derived from the system output voltage to said fixed reference voltage and operative to generate a second control signal having a first signal state when a third predetermined difference indicative of normal operation of the system is detected between the voltage compared by said second comparator means, and having a second signal state where a fourth predetermined difference indicative of a malfunctioning system is detected between the compared voltages, and switching means responsive to said first and second control signals and operative to connect said current sharing signal terminal to said interconnecting bus when both said first and second control signals are of said first signal state, and to disconnect said current sharing signal terminal from said interconnecting bus when either of said first and second control signals is of said second signal state, whereby in the event one of said power converter module malfunctions, it will be effectively disconnected from the system.

11. An improved power supply system as recited in claim 10 wherein said fixed reference means is coupled to a particular output of said power converter module and is operative to cause said fixed reference voltage to have a predetermined relationship to the voltage appearing on said particular output.

12. An improved power supply system as recited in claim 10 wherein a scaling resistor is used to develop a scaled voltage proportioned to a voltage developed by said module, and wherein said second comparator means compares the scaled voltage to said fixed reference voltage and causes said second control signal to be of said first signal state when the voltage differential input thereto exceeds a predetermined threshold, and causes said second control signal to be of said second signal state when the voltage differential input thereto is less than said predetermined threshold.

13. An improved power supply system as recited in claim 12 wherein said switching means is a bi-directional electronic device allowing current to flow in either direction therethrough.

14. An improved power supply system as recited in claim 10 wherein each said module further includes a setpoint adjust terminal, and wherein said system further comprises:

a plurality of startup assist circuits, each of which is connected between the setpoint adjust port and the control port of the switching means of an associated module, said start-up circuits being operative to assure start-up of the associated module each time it is connected into the system.

15. An improved power supply system as recited in claim 10 wherein each power converter module has a current sharing port on its input side and a set point adjust port on its output side, wherein in each coupling/decoupling circuit the variable reference means, the first comparator means and the switching means are associated with the input side of the associated power converter module, and the second comparator means is associated with the output side of the associated power converter module, and wherein the control input to the switching means is split between the input and output sides of the circuit.

16. An improved power supply system as recited in claim 15 wherein signal isolation means is provided to electrically isolate control signals developed on the output side from the input side.

17. An improved circuit as recited in claim 16 wherein said signal isolation means is bi-directional and also serves to electrically isolate control signals developed on the input side from the output side.

18. An improved as recited in claim 16 wherein said signal isolation means includes opto-isolator apparatus.

19. An improved as recited in claim 17 wherein said signal isolation means includes opto-isolator apparatus.

* * * * *